(12) United States Patent
Tomoda et al.

(10) Patent No.: US 6,377,243 B1
(45) Date of Patent: Apr. 23, 2002

(54) DATA INPUT DEVICE AND THE METHOD THEREOF

(75) Inventors: Daisuke Tomoda, Yokohama; Yoshinori Tahara, Yamato; Tohru Tabara, Yokohama, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/082,141

(22) Filed: May 20, 1998

(30) Foreign Application Priority Data

Jul. 30, 1997 (JP) .............................. 9-204201

(51) Int. Cl.[7] .............................. G09G 5/08
(52) U.S. Cl. ................... 345/163; 345/167; 345/168
(58) Field of Search ................ 345/156, 157, 345/158–163, 173, 168

(56) References Cited

U.S. PATENT DOCUMENTS

| | | | | |
|---|---|---|---|---|
| 5,179,655 A | * | 1/1993 | Noguchi et al. ............ | 395/158 |
| 5,336,001 A | * | 8/1994 | Lichtenberg ................ | 345/163 |
| 5,596,656 A | | 1/1997 | Goldberg | |
| 5,825,362 A | * | 10/1998 | Retter ........................ | 345/357 |
| 5,844,547 A | * | 12/1998 | Minakuchi et al. ......... | 345/173 |
| 5,903,229 A | * | 5/1999 | Kishi ........................... | 341/20 |
| 6,016,478 A | * | 1/2000 | Zhang et al. ................. | 705/9 |
| 6,016,520 A | * | 1/2000 | Facq et al. ................... | 710/33 |
| 6,100,875 A | * | 8/2000 | Goodman et al. ........... | 345/163 |
| 6,104,384 A | * | 8/2000 | Moon et al. ................. | 345/168 |
| 6,111,527 A | * | 8/2000 | Susel ........................... | 345/163 |

FOREIGN PATENT DOCUMENTS

| | | | |
|---|---|---|---|
| EP | 0660218 A1 | 6/1995 | ........... G06F/3/033 |
| EP | 0844571 A2 | 5/1998 | ........... G06F/17/28 |

OTHER PUBLICATIONS

Patent Abstracts of Japan vol. 018 No. 244 (P–1734) May 10, 1994, Japanese application No. 06 028084.
Patent Abstract of Japan vol. 018 No. 021 (P–1674) Jan. 13, 1994, Japanese application No. 05 257598.
European Search Report EP 98 30 6606.

* cited by examiner

*Primary Examiner*—Richard Hjerpe
*Assistant Examiner*—Kimnhung Nguyen
(74) *Attorney, Agent, or Firm*—J. Bruce Schelkopf; Bracewell & Patterson, LLP (57) ABSTRACT

The operability in inputting data using a so-called software keyboard is provided wherein a computer displays a software keyboard and a target window to which data is to be inputted, determines whether or not either one of the two buttons of a mouse is clicked, selects data indicated by the pointed key when the left button is clicked and displays it in correlation to the cursor. By repeating the above processes, data is selected and displayed in a frame near the cursor. When the user clicks the target window, the computer supplies data of the character string so far selected to the target program as input data.

7 Claims, 8 Drawing Sheets

Move the Mouse Cursor to the Key "O" and Click

Move the Mouse Cursor to the Key "J"

*Fig. 4A*

Click the Left Button of the Mouse

*Fig. 4B*

Move the Mouse Cursor to the Key "O" and Click

Fig. 5A

Move the Mouse Cursor to the Key "Y" and Click

(A)  As Mouse Pointer Moves, Character String (Window Display) also Moves Simultaneously (B)  Convert to Upper Case by Clicking Right Button of Mouse

(C)  Convert to Subscript by Clicking Right Button of Mouse (D)  Input Character String is Entirely Erased by Depressing Right and Left Buttons Simultaneously (Cancel)

DATA INPUT DEVICE AND THE METHOD THEREOF

FIELD OF THE INVENTION

This invention relates to a data input device and a data input method for inputting data by operating a keyboard displayed on the screen using a pointing device such as a mouse in a portable computer.

BACKGROUND OF THE INVENTION

In recent years, a demand for a small size computer for use in a mobile environment, which is carried along and used in a place to which it moved or a small size computer of network connection type for use in connection to a network in a place to which it moved, has been increased.

Such a computer is preferentially made in a small size for convenience of portability and, as a consequence, a conventional keyboard is often eliminated in such a computer or, even when a keyboard is provided, operability of the keyboard may not be satisfactory.

In view of the above, a method is often employed in such a small size computer for displaying an image of a keyboard in the display screen and selecting data by pointing at characters in the displayed keyboard for input with a pointing device such as a mouse, that is a data input method using a software keyboard.

A device using such software keyboard is known in an image display control device described in a Japanese Document PUPA 3-251893 (reference 1). Further, a Japanese Document PUPA 4-137125 (reference 2), for example, relates to an engineering workstation in which the same data is inputted and displayed simultaneously in a plurality of windows.

However, the devices described in these references have not solved the complexity of manipulation and unsatisfactory conditions of operability in that, for data input, a target window has to be selected by moving a mouse cursor by manipulating a mouse, the type of data has to be then selected by moving the mouse cursor within the target window, and the mouse cursor has to be moved to the image of software keyboard for inputting data.

SUMMARY OF THE INVENTION

This invention was conceived in view of the above described problems and its object is to improve the operability in the inputting technique using a so-called software keyboard. It is another object of this invention to improve the input efficiency of data by minimizing the movement of a pointing device in manipulating a keyboard with a pointing device such as a mouse.

In order to achieve the above objectives, the data input device of this invention includes, a data image display for displaying one or more data images indicating one or more data items to be inputted in a display screen, data input indicating image display feature for displaying a data input indicating image indicating input of data, a pointing feature responsive to external manipulation for pointing the position in the display screen of either one of the displayed data images or the displayed data input indicating image, a data input selecting feature responsive to external manipulation for selecting data indicated by the data image at the position pointed in the display screen, a selected data display feature for displaying one or more selected data items in correlation to the position pointed in the display screen, and a data input feature operable when the position of the data input indicating image is pointed in the display screen for receiving one or more selected data items as input data.

Preferably, the data input device further includes a data conversion indicating feature responsive to external manipulation for indicating to convert the selected data and data conversion features responsive to the indication of data conversion to perform a predetermined conversion of the selected data.

Preferably, the data input device further includes a pointing device, the pointing feature, responsive to manipulation of the pointing device, pointing the position in the display screen of either one of the displayed data images or the displayed data input indicating image to display a cursor at the pointed position, and the selected data display feature displaying the selected data in correlation to the cursor displayed in the display screen.

Preferably, the pointing device has one or more buttons, and the data input selecting feature, responsive to manipulation of the button of the pointing device, selects data indicated by the data image at the pointed position in the display screen.

Preferably, the pointing device has one or more buttons, the data conversion indicating feature, responsive to manipulation of the button of the pointing device, indicates the type of conversion of data, and the data conversion means applies indicated type of conversion to the selected data.

Preferably, the pointing device has multiple buttons, and the data conversion indicating feature indicates conversion of the type corresponding to the combination of the buttons of the manipulated pointing device and the manner of manipulation of the button of the pointing device.

Preferably, the data conversion indicating means indicates at least upper/lower/subscript conversion as the type of conversion in response to manipulation of the pointing device when the selected data is character data, and the data conversion feature performs upper/lower/subscript conversion on the selected data depending on the indicated type of conversion.

The data input device of this invention displays an image of a keyboard in the display screen of a small size computer which does not have a keyboard, for example, and selects data inputted by depressing a key within the image to input it to a data processing application software.

In the data input device of this invention, the data image display feature displays, for example, a software keyboard in the screen and further displays an image of a plurality of keys associated with alphabet characters, Kana characters and symbols as a data image indicating data to be inputted.

The data input indicating image display feature displays the image of an input button in the window which the above application program displays in the display screen as a data input indicating image indicating input of data. The image of this input button is used for taking in data for which selection of data is completed by the user's pointing and which is selected by the application program.

The pointing feature moves the mouse cursor in the display screen in response to the user's manipulation of the pointing device such as a mouse having a button, for example, to point to an arbitrary position in the display screen, at least any position of the data image (image of the software keyboard), or a position of the data input indicating image (input button in the window of the application program).

When the user moves the mouse cursor, for example, to a data image (image of a key of the software keyboard) to point it and further depresses the left button (click), the data input selection feature selects the data indicated by the pointed data image (data indicating a character and a symbol, etc., displayed on the image of a key) in response to an external manipulation.

The selected data display feature displays data indicating a character string selected by repeated pointing to data images and data selections, that is, repeated movements of the mouse cursor by a mouse and clicking in association with the mouse cursor, for example, near the mouse cursor. By displaying the selected character near the mouse cursor, the user can easily confirm the data so far selected without losing it and, in addition, is less fatigued because the movement of the user's eye is less.

When the user points to an input button in the window of the application program and clicks it, the data input feature supplies data of the character string so far selected and displayed in the selected data display feature to the application program and further displays it in the window of the application program, for example. In other words, the user can input data in a feel as if he or she drops the character string picked up from the software keyboard to the window of the application program (pick up and drop) and, in addition, manipulation of the mouse (movement of mouse cursor) can be largely decreased when compared to the prior art method.

The data conversion indicating means selects the type of conversion processing such as upper/lower/subscript conversion depending on whether the user depressed a plurality of buttons of the mouse in combination, single clicked, or double clicked.

By allowing the type of conversion to be selected by the mouse button in this manner, the user can select the type of conversion without the movement of the mouse cursor and with an improved operability when compared to the case where the type of conversion is selected by clicking other buttons of the window.

The data conversion feature applies a conversion of the type selected by the data conversion indicating feature to the data of character string so far selected and displayed in the selected data display means. The converted data is supplied to the application in the manner similar to the case where the data is not converted or displayed in the window, etc., in response to clicking of the data input button, for example.

The data input method of this invention includes the steps of displaying one or more data images indicating one or more data items to be inputted in a display screen, displaying a data input indicating image indicating input of data, pointing the position in the display screen of either one of the displayed data images or the displayed data input indicating image in response to external manipulation, selecting data indicated by the data image at the position pointed in the display screen in response to external manipulation, displaying one or more selected data items in correlation to the position pointed in the display screen, and receiving one or more selected data items as input data when the position of the data input indicating image is pointed in the display screen.

The recording medium of this invention records a program for causing a computer to execute the steps of displaying one or more data image indicating one or more data items to be inputted in a display screen, displaying a data input indicating image indicating input of data, pointing the position in the display screen of either one of the displayed data images or the displayed data input indicating image in response to external manipulation, selecting data indicated by the data image at the position pointed in the display screen in response to external manipulation, displaying one or more selected data items in correlation to the position pointed in the display screen, and receiving one or more selected data items as input data when the position of the data input indicating image is pointed in the display screen.

BRIEF DESCRIPTION OF DRAWINGS

FIGS. 4 (A), (B) are diagrams showing operations in the first and the second steps of input data selection using a software keyboard displayed in the display device of the computer of FIG. 1.

FIGS. 5 (A), (B) are diagrams showing operations in the third and the fourth steps of input data selection using a software keyboard displayed in the display device of the computer of FIG. 1.

FIGS. 8 (A) to (D) are diagrams showing the type of conversions of selected data which is displayed in correlation to the mouse cursor.

FIGS. 9 (A), (B) are a diagram showing an example of data input method using a conventional software keyboard.

DETAILED DESCRIPTION OF THE PREFERRED EMBODIMENT

The following is a description of reference characters illustrated in the figures and includes: 100 CPU, 102 memory, 104 display device, 106 pointing device IF, 108 bus, 110 mouse, 112 left button, 114 right button, 200 data input part, 202 software keyboard part, 204 display part, 206 pointing device control part and 210 target program.

Figure 1:
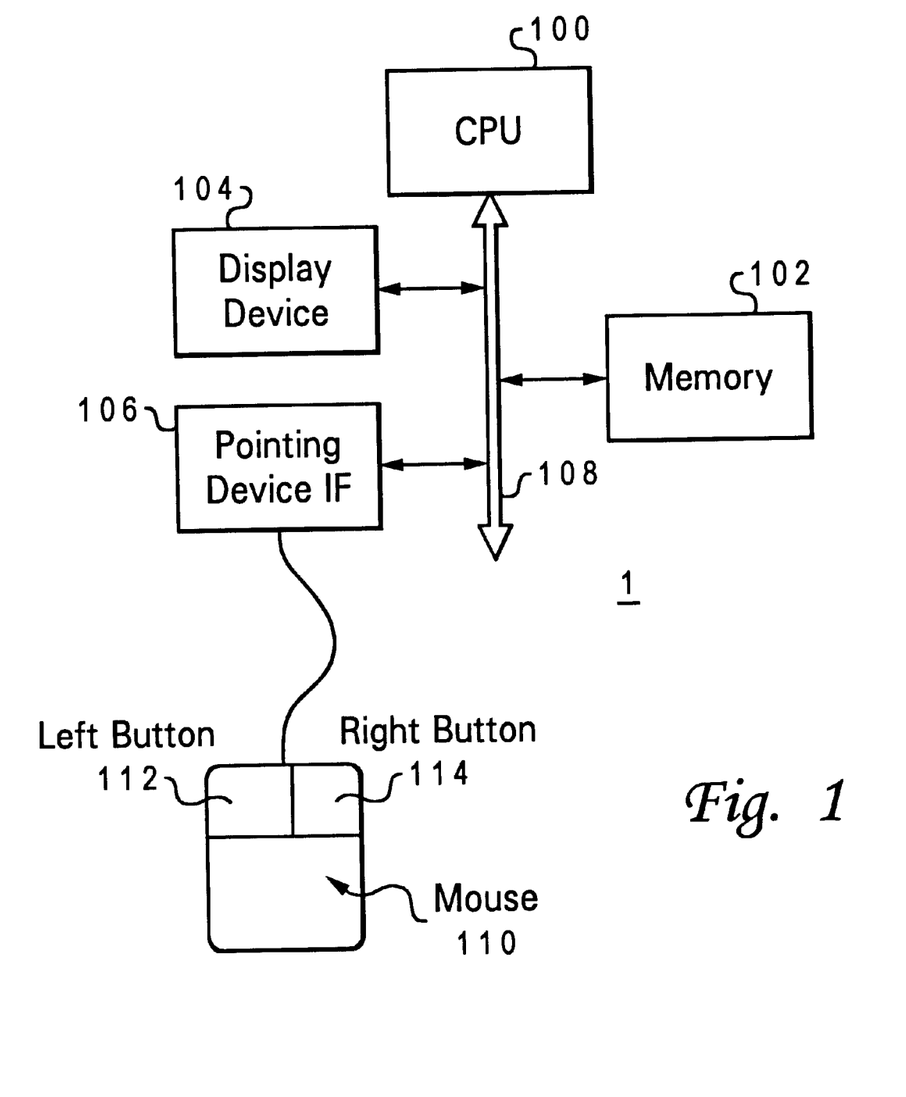
FIG. 1 is a diagram showing the configuration of a computer to which the data input method of this invention is applied.

The configuration of a computer 1 is now described. FIG. 1 is a diagram showing the configuration of the computer 1 to which the data input method of this invention is applied. As shown in FIG. 1, the computer 1 is a small size computer, a small size portable computer for use in a mobile environment or for connection to a network in which a keyboard is eliminated or a PDA (personal digital assistant) device and comprises a CPU 100, a memory 102, a display device 104, and a pointing device interface (IF) 106 connected via a bus 108. A mouse 110 provided with a plurality of buttons (left button 112, right button 114) is connected to the pointing device IF 106.

While a touch panel or a tablet for stylus input, etc., may be connected to the pointing device IF 106 beside the mouse 110, a case where the mouse 110 is connected to the pointing device IF 106 is explained as an example hereunder for the simplicity and clarity of explanation. Also, while a recording device such as a hard disk and communication devices for network connection may be included in the components beside those shown in FIG. 1, those components which are not directly relevant to the explanation of this invention are omitted.

With these components, the computer 1 receives input data in response to user's manipulation using the mouse 110 of the image of a keyboard which includes the image of a plurality of keys displayed in the display device 104 and associated with respective characters and symbols. In other words, the computer 1 receives input data by a software keyboard and supplies the received input data to a target application program.

The components of the computer 1 are now described hereunder. In the computer 1, the CPU 100 comprises a general purpose microprocessor and peripheral circuits thereof, for example and executes a software stored in the memory 102. In other words, the CPU 100 executes a software including a user interface program and an application program on an operating system (OS) having a multi-task multi-window function.

The display device 104 is a liquid crystal display device provided in the computer 1, for example, and displays an application program (also referred to as a target program), respective windows, a software keyboard for data input and a mouse cursor, etc., for presentation to a user.

The pointing device IF 106 receives a manipulation signal inputted from the mouse 110 in response to user's manipulation and outputs mouse cursor position data indicating the position of the mouse cursor which is moved in response to the direction and the distance in which the user moved the mouse 110, and button data indicating which of the left button 112 and the right button 114 was clicked or both were clicked (they are collectively referred to as manipulation data) to the CPU 100.

Figure 2:
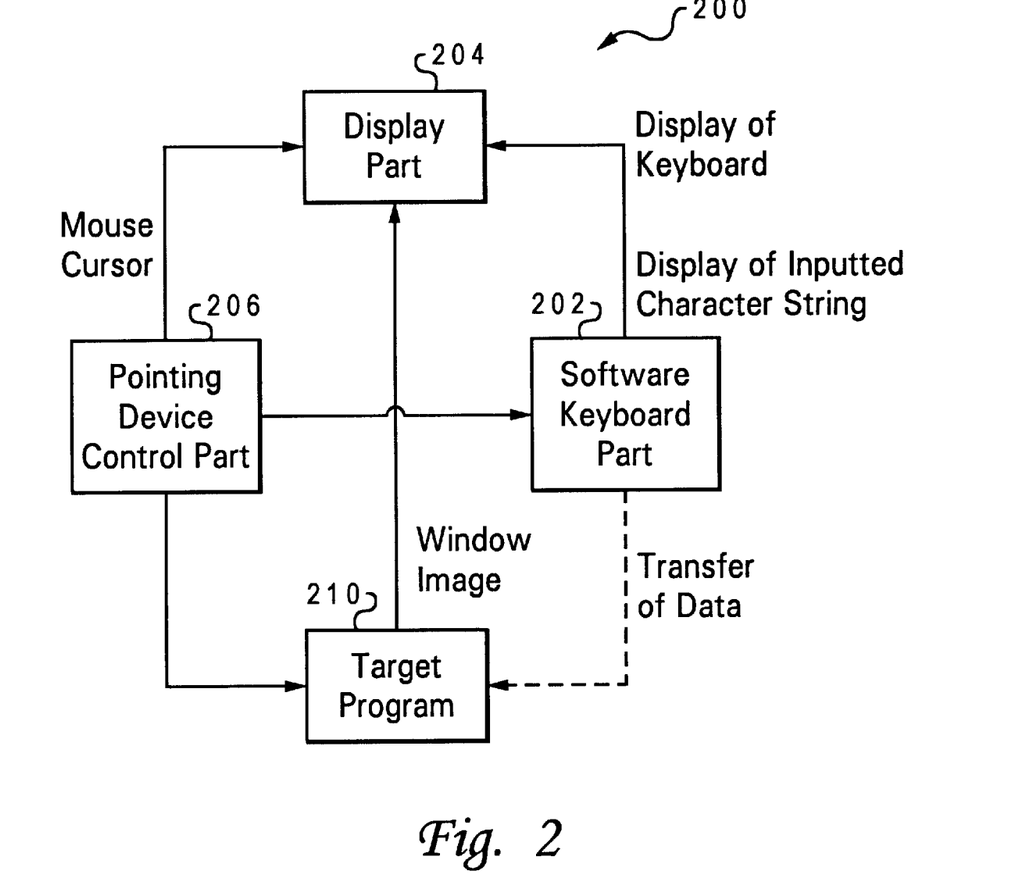
FIG. 2 is a diagram showing a software configuration of a computer shown in FIG. 1.

The software of the computer 1 is now described hereunder. FIG. 2 is a diagram showing a software configuration of the computer 1 shown in FIG. 1. As shown in FIG. 2, a data input part 200 and a target program 210 are stored in the memory 102 of the computer 1 of FIG. 1 and these software is executed on the multi-task multi-window OS (not shown) by the CPU 100 as described in the above. The data input part 200 comprises a software keyboard part 202, a display part 204 and a pointing device control part 206.

The software keyboard part 202 generates image data of a software keyboard (described later with reference to FIGS. 4 (A), (B)) and supplies it to the display part 204. In addition, the software keyboard part 202 selects data indicated by a key in the software keyboard which is pointed by the mouse cursor in response to manipulation data inputted from the pointing device control part 206 and displays the selected data in correlation to the mouse cursor, for example, near the mouse cursor with a frame associated therewith.

The software keyboard part 202 also performs conversion processing of the selected data depending on the content of the button data. The software keyboard part 202 also determines whether an arbitrary position in a region of the window displayed in the display device 104 by the target program 210 or the display position of the button for data input, for example, is pointed and clicked based on the manipulation data and, when such positions are pointed and clicked, supplies the selected data or converted data to the target program as input data.

The pointing device control part 206 outputs manipulation data inputted from the mouse 110 to the CPU 100 via the pointing device IF 106 to the target program 210 and the software keyboard part 202 and generates an image of the mouse cursor based on the manipulation data for output to the display part 204.

The display part 204 displays the image of the mouse cursor inputted from the pointing device control part 206, the image and the selected data inputted from the software keyboard part 202, and the image of the window of the application program inputted from the target program 210 in the display device 104.

The target program 210 which is a software such as an editor displays a target window (to be described later with reference to FIG. 6 and FIG. 7) in the display device 104 and input data supplied from the software keyboard part 202 in the target window to perform a predetermined processing on the input data.

Figure 3:
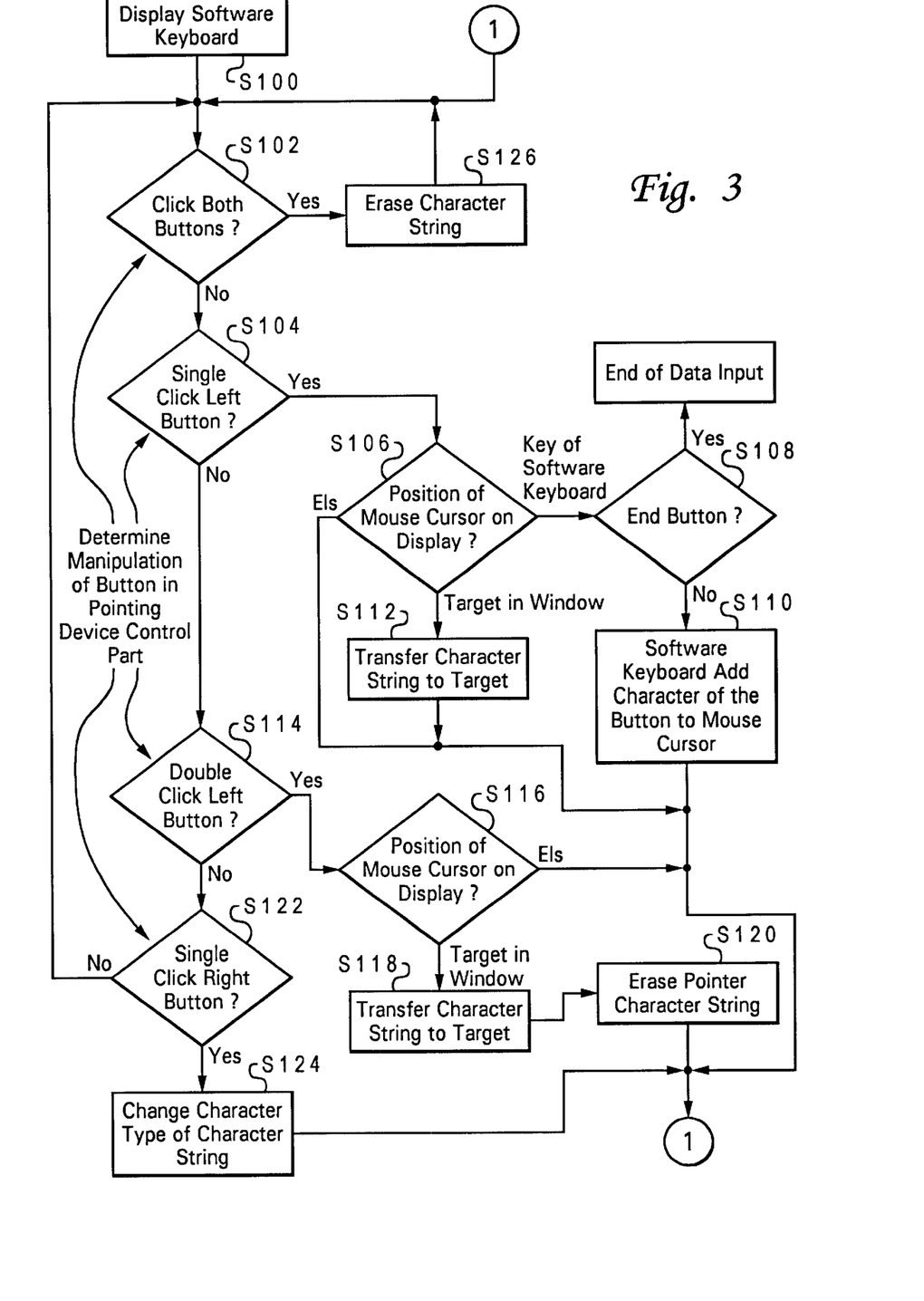
FIG. 3 is a flow chart showing the operation of the computer shown in FIG. 1.
Figure 4A:
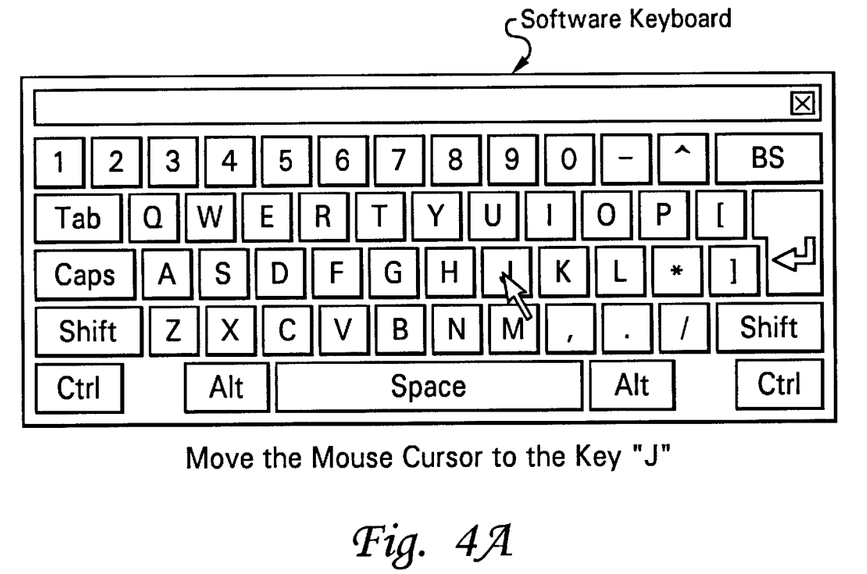
Figure 4B:
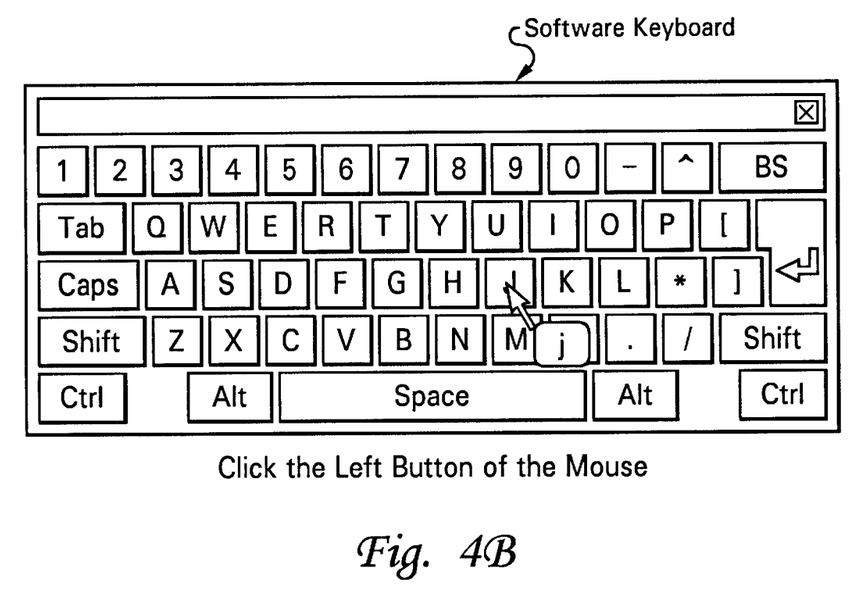
Figure 5A:
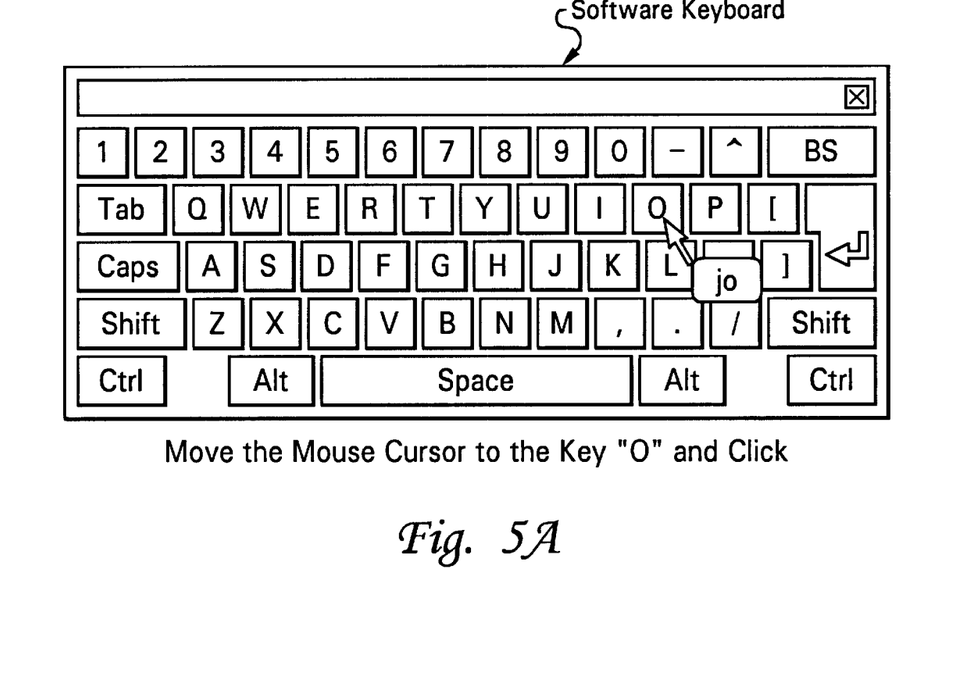
Figure 5B:
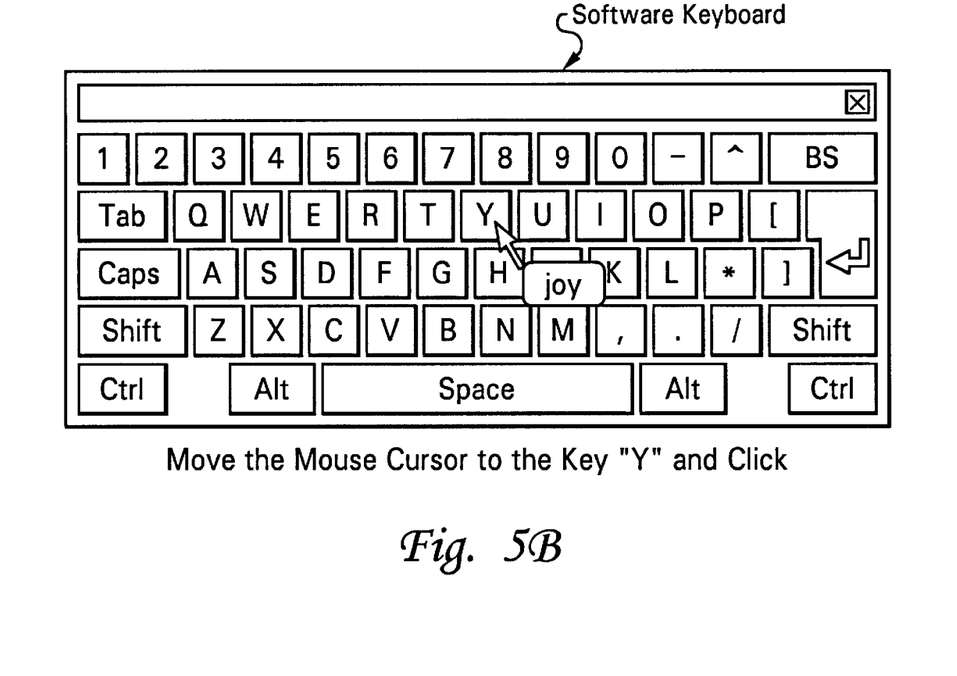
Figure 6:
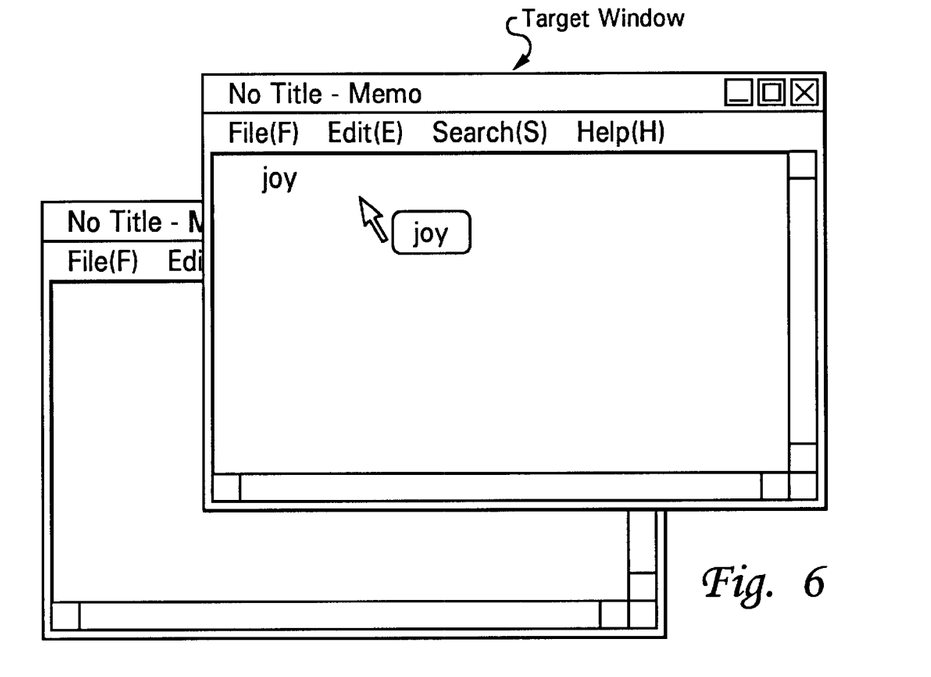
FIG. 6 is a diagram showing the operation in the step of inputting selected data to a target program and displaying it.
Figure 7:
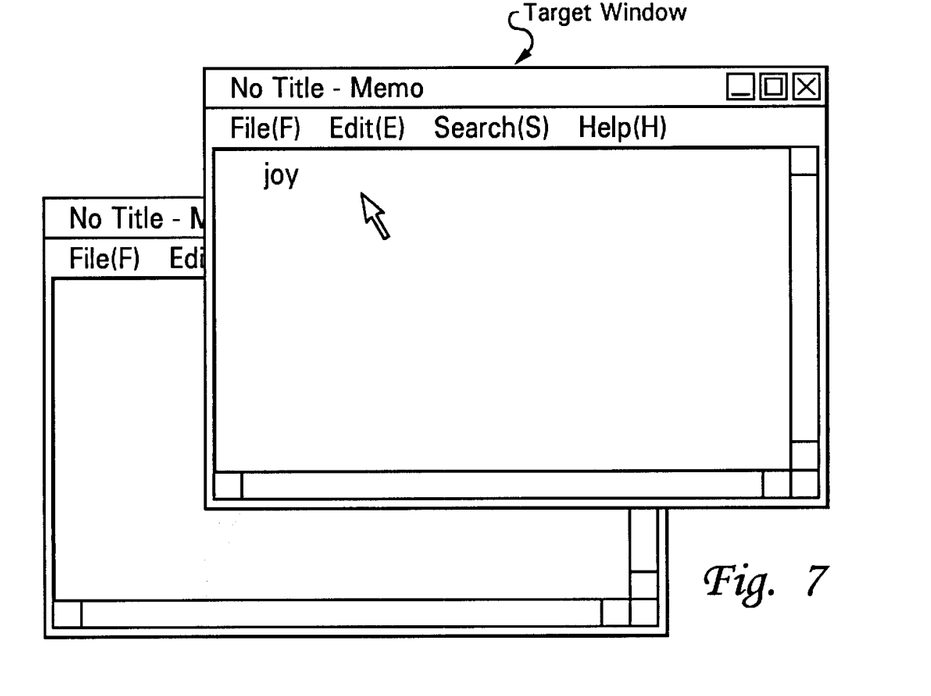
FIG. 7 is a diagram showing the operation in the step of erasing display of selected data associated with a mouse cursor.
Figure 8:
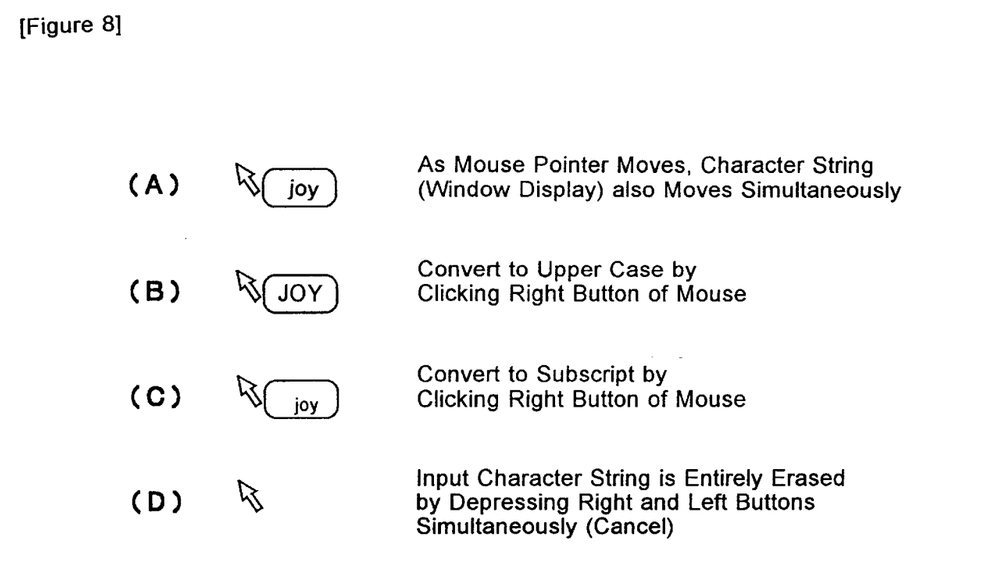

The operation of the computer 1 is now described further with reference to FIG. 3 to FIG. 9. FIG. 3 is a flow chart showing the operation of the computer 1 shown in FIG. 1. FIGS. 4 (A), (B) are diagrams showing the first and the second steps of input data selection using the software keyboard which is displayed in the display device 104 of the computer 1 of FIG. 1. FIGS. 5 (A), (B) are diagrams showing the third and the fourth steps of data selection using the software keyboard which is displayed in the display device 104 of the computer 1 of FIG. 1. FIG. 6 is a diagram showing the operation in the step of inputting selected data to the target program 210 for display. FIG. 7 is a diagram showing the operation in the step of erasing display of the selected data associated with the mouse cursor. FIGS. 8 (A) to (D) are diagrams showing the type of conversions of selected data displayed in association with the mouse cursor. As shown in FIG. 3, in step 100 (S100), the software keyboard part 202 of the computer 1 displays a software keyboard as shown in FIGS. 4 (A), (B) and FIGS. 5 (A), (B) (FIG. 4 (A) is an initial image) in the display device 104 while the target program 210 displays a target window shown in FIG. 6 and FIG. 7.

In step 102 (S102), the software keyboard part 202 determines whether or not both the left button 112 and the right button 114 of the mouse 110 are clicked by the user based on the button data inputted from the pointing device control part 206 and, when both are clicked, proceeds to S126 while proceeding to S104 otherwise.

In step 104 (S104), the software keyboard part 202 determines whether or not the left button 112 is clicked by the user based on the button data inputted from the pointing device control part 206 and, when the left button 112 is clicked once (single click), proceeds to S106 while proceeding to S114 otherwise.

In step 106 (S106), the software keyboard part 202 determines in which position the mouse cursor is in the screen based on the mouse cursor position data inputted from the pointing device control part 206 and, when the mouse cursor is in the position of a key of the software keyboard, proceeds to S108 while proceeding to S112 when the mouse cursor is in the range of the target window as shown in FIG. 6. Otherwise, it returns to S102.

In step 108 (S108), the software keyboard part 202 determines whether or not the mouse cursor is in the position of a button (end button) used for indicating the end of data input in the software keyboard and, when the it is in the position of the end button, ends data input while it proceeds to S110 otherwise.

In step 110 (S110), the software keyboard part 202 selects data indicated by the key of the software keyboard pointed as shown in FIG. 4 (B) ["j" in the example shown in FIG. 4 (B)] and displays it in correlation to the mouse cursor, for example, with a frame associated to the periphery of the selected data.

By repeating the processes of the steps S102 to S110 as described in the above, data is selected one after the other by clicking the keys of the software keyboard as further shown in FIGS. 5 (A), (B), and are displayed in the frame correlated to the proximity of the mouse cursor. FIGS. 5 (A), (B) show, as an example, the case where a data string of "joy" is eventually selected and displayed.

In step 112 (S112), the software keyboard part 202 supplies data of the character string so far selected (selected data) to the target program 210 as input data.

As shown in FIG. 6, the target program 210 displays the supplied input data in the target window. In step 114 (S114), the software keyboard part 202 determines whether or not the left button 122 is double clicked based on the button data inputted from the pointing device control part 206 and, when it is double clicked, proceeds to S116 while it proceeds to S122 otherwise.

In step 116 (S116), the software keyboard part 202 determines the position of the mouse cursor in the screen of the display device 104 and, when it is in the target window, proceeds to S118 while it returns to the process of S102.

In step 118 (S118), the software keyboard part 202 supplies the selected data to the target program 210 as input data in the manner similar to S112 and the target program in turn displays the supplied input data in the target window as shown in FIG. 6.

In step 120 (S120), the software keyboard part 202 erases display of the selected data correlated to the mouse cursor as shown in FIG. 7.

By the process of S118, S120, the user can input data in a feel as if he or she brings a character picked up from the software keyboard to the target window along with the mouse cursor and moves (drops) it from the mouse cursor into a field of the target window.

In step 122 (S122), the software keyboard part 202 determines whether or not the right button 114 is single clicked and, when it is single clicked, proceeds to the process of S124 while it returns to the process of S102 otherwise.

In step 124 (S124), the software keyboard part 202 performs upper case/lower case conversion and upper subscript/lower conversion and upper subscript/lower subscript conversion on the selected data so far selected. The type of conversion process in S124 is changed each time the user further single clicks the right button 122.

In other words, the type of converting the character string "joy" is changed cyclically in the sequence of "lower case"—"upper case"—"subscript" as shown in FIGS. 8 (A), to (C). Also, when the selected data includes a plurality of types of data (half em character and em character) in this case, the selected data is converted to a same type of data, for example. The selected data so converted is also supplied to the target program as input data in the process of S112, S118 in the manner similar to the selected data which is not converted.

In step 126 (S126), the software keyboard part 202 erases the display of the selected data correlated to the mouse cursor as shown in FIG. 8 (D).

Figure 9:
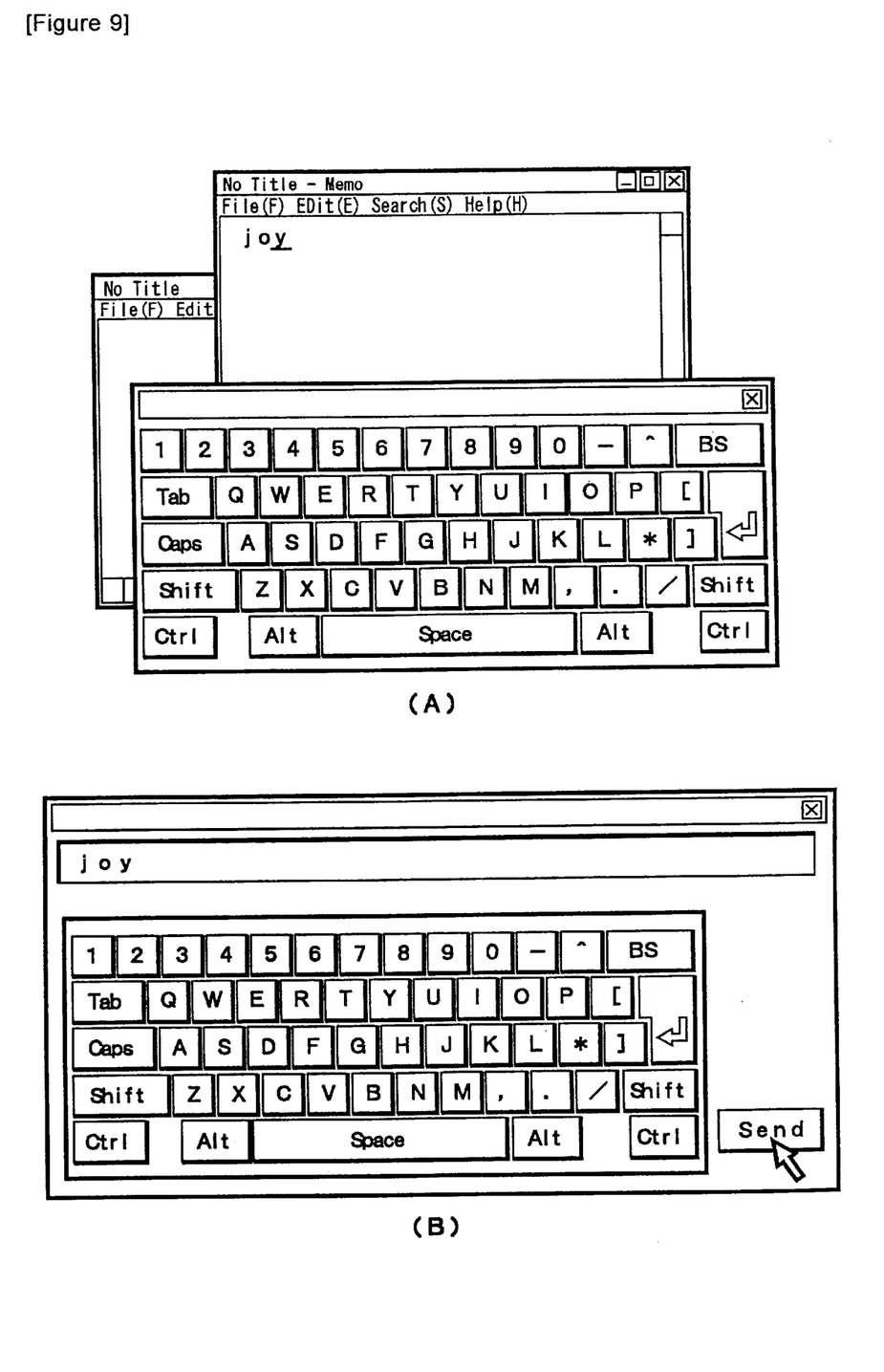

The characteristic feature of the data input method of the computer 1 is now described hereunder with reference to FIG. 9. FIGS. 9 (A), (B) are diagrams showing an example of data in put method using a conventional software key. Data input using a conventional software key has been done by selecting (focusing) a target window, selecting data by a key manipulation of a software keyboard and clicking a Send button of the target window. However, by clicking the target window after the data is selected, decision of input data and selection of the target window are done simultaneously by a single operation. Also, because the type of characters can be changed only by a mouse manipulation (refer to the process of S124 and FIGS. 8 (A) to (C)), the operability of an information equipment such as a portable computer which uses a software keyboard can be greatly improved according to the data input method of the computer 1.

Because an operation of pointing the target window and single clicking the left button 112 may be repeated in order to supply same data to a plurality of target windows (refer to the process of S112, FIG. 3), same data is very efficiently supplied to a plurality of target windows according to the data input method of the computer 1. Also, because data input by the software keyboard can be done efficiently by a single hand, a convenient user interface is provided to a handicapped person who injured one of the hands by accident or is unable to move freely at his or her will.

While a mouse was used as a pointing means in this embodiment, other means such as the tablet or a joystick may be used instead of a mouse. The configuration of the computer 1 and its software are exemplarily given in the above and they may be replaced with other means so long as an equivalent function and performance are available. It should be further understood that the data input method of the computer 1 may be applicable to other devices such as a desk top computer and a word processor beside a portable computer.

As described in the above, the operability of data input using a so called software keyboard can be greatly improved according to the data input device and method of this invention. Also, according to the data input device and method of this invention, the input efficiency of inputtng data can be largely improved by minimizing the movement of a pointing device in manipulating a software keyboard by a pointing device such as a mouse.

That which is claimed is:

1. A method for efficiently inputting a sequence of characters into a computer process within a computer having a display, a pointing device and a cursor associated with the pointing device, said method comprising the steps of:

displaying a visual representation of a keyboard within said display, said keyboard having individual keys therein, each of said individual keys having a character associated therewith;

sequentially selecting a plurality of said individual keys utilizing said cursor associated with said pointing device;

graphically displaying in proximity to said cursor a sequence of characters corresponding to selected individual keys in response to each selection of an individual key;

relocating said cursor and said graphically displayed sequence of characters to an image within said display corresponding to a computer process; and inputting said graphically displayed sequence of characters into said computer process in response to a user input.

2. The method for efficiently inputting a sequence of characters into a computer process within a computer according to claim 1, wherein said step of inputting said graphically displayed sequence of characters into said computer process in response to a user input comprises the step of inputting said sequence of characters into said computer process at a location of said cursor in response to a user input.

3. The method for efficiently inputting a sequence of characters into a computer process within a computer according claim 1, further including the step of altering a display of a selected one of said graphically displayed sequence of characters to an upper case script in response to a user input.

4. The method for efficiently inputting a sequence of characters into a computer process within a computer according claim 1, further including the step of altering a display of a selected one of said graphically displayed sequence of characters to an lower case script in response to a user input.

5. The method for efficiently inputting a sequence of characters into a computer process within a computer according claim 1, further including the step of altering a display of a selected one of said graphically displayed sequence of characters to a subscript display in response to a user input.

6. A computer system comprising:

a processor;

a display coupled to said processor for displaying a visual representation of a keyboard having individual keys therein, each of said individual keys having a character associated therewith;

a pointing device coupled to said processor and having a displayed cursor associated therewith for graphical selection of sequence of individual keys within said visual representation of said keyboard;

a display control coupled to said processor for graphically displaying in proximity to said cursor a sequence of characters corresponding to selected individual keys in response to each selection of an individual key; and an input control coupled to said processor for inputting said graphically displayed sequence of characters at a selected location within said display in response to a user input.

7. The computer system according to claim 6, wherein said pointing device comprises a mouse.

* * * * *